(12) United States Patent
Fujita et al.

(10) Patent No.: US 7,754,309 B2
(45) Date of Patent: Jul. 13, 2010

(54) CERAMIC HONEYCOMB STRUCTURE BODY AND METHOD OF MANUFACTURING THE SAME

(75) Inventors: Jun Fujita, Nagoya (JP); Naoshi Masukawa, Aichi (JP); Takashi Harada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1054 days.

(21) Appl. No.: 10/542,010

(22) PCT Filed: Jan. 14, 2004

(86) PCT No.: PCT/JP2004/000195

§ 371 (c)(1),
(2), (4) Date: Apr. 24, 2006

(87) PCT Pub. No.: WO2004/063121

PCT Pub. Date: Jul. 29, 2004

(65) Prior Publication Data

US 2007/0059483 A1    Mar. 15, 2007

(30) Foreign Application Priority Data

Jan. 14, 2003    (JP) .............................. 2003/006072

(51) Int. Cl.
*B32B 3/12*       (2006.01)
*B01D 39/06*    (2006.01)
*B31B 1/60*      (2006.01)
*C03B 29/00*    (2006.01)
*B28B 1/00*      (2006.01)

(52) U.S. Cl. ..................... 428/116; 55/523; 156/60; 156/89.11; 264/630

(58) Field of Classification Search ............. 428/116, 428/117, 118, 119, 188, 913, 327, 73, 307.5, 428/34.5, 177, 304.4, 192; 501/118, 119, 501/120, 153, 154; 55/523, 585.3, 483, 502, 55/529; 264/177.12
See application file for complete search history.

(56) References Cited

U.S. PATENT DOCUMENTS

2003/0138596 A1*  7/2003  Harada et al. ............... 428/116

FOREIGN PATENT DOCUMENTS

| EP | 1 101 910 A2 | 5/2001 |
|----|---|---|
| EP | 1 366 792 A1 | 12/2003 |
| JP | A-4-367574 | 12/1992 |
| JP | A-3-192683 | 7/2001 |
| JP | A 2002-102627 | 4/2002 |
| WO | WO 02/070106 A1 | 9/2002 |
| WO | WO 03/031371 A1 | 4/2003 |

* cited by examiner

*Primary Examiner*—David R Sample
*Assistant Examiner*—Nicole T Gugliotta
(74) *Attorney, Agent, or Firm*—Oliff & Berridge, PLC (57) ABSTRACT

A ceramic honeycomb structure body (1) including a configuration in which a plurality of porous honeycomb segments (2) are bound one another with an adhesive layer (3) interposed between each two neighboring porous honeycomb segments (2), where a plurality of protrusion portions (4) fixed to one of the adhesion surfaces (2a, 2b) respectively of two honeycomb segments (2, 2) opposed to each other with the adhesive layer (3) interposed between the two honeycomb segments (2, 2) are embedded into the adhesive layer (3).

9 Claims, 10 Drawing Sheets

CERAMIC HONEYCOMB STRUCTURE BODY AND METHOD OF MANUFACTURING THE SAME

TECHNICAL FIELD

The present invention relates to a ceramic honeycomb structure body in use for filters for collecting particles in exhaust gases from inner combustion engines and boilers as well as catalyst bearers utilizing a catalyst to be used for chemical reactors, fuel cell reformers and the like, and relates to a method of manufacturing the same.

BACKGROUND ART

Figure 1:
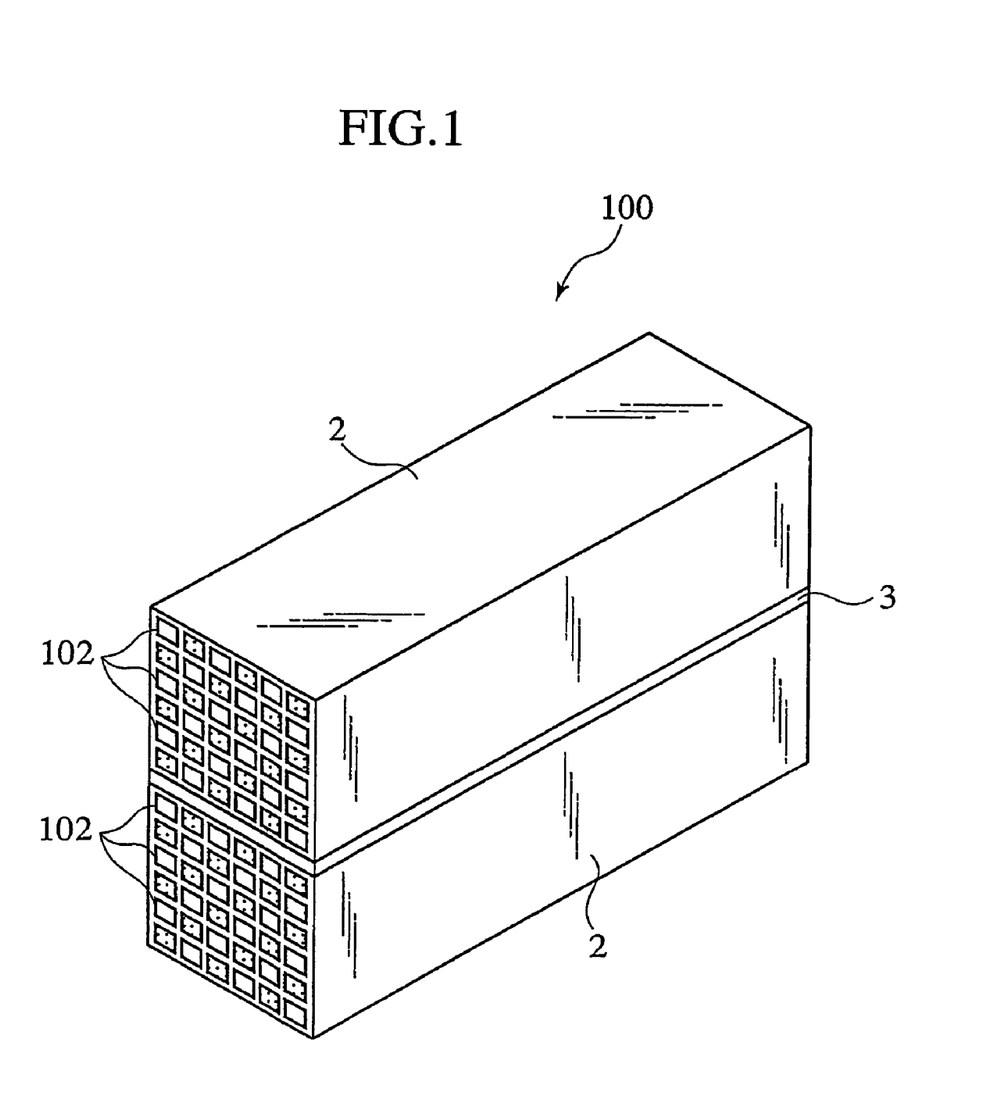
FIG. 1 is an explanatory view of a conventional ceramic honeycomb structure body.

A ceramic honeycomb structure body 100 has been proposed, which has a configuration in which a plurality of porous honeycomb segments 2 each having a large number of circulation holes 102 are bound one another with an adhesive layer 3 interposed between each two neighboring porous honeycomb segments, as shown in FIG. 1.

However, the ceramic honeycomb structure body 100 has the following problem with the adhesive layers 3.

Figure 2:
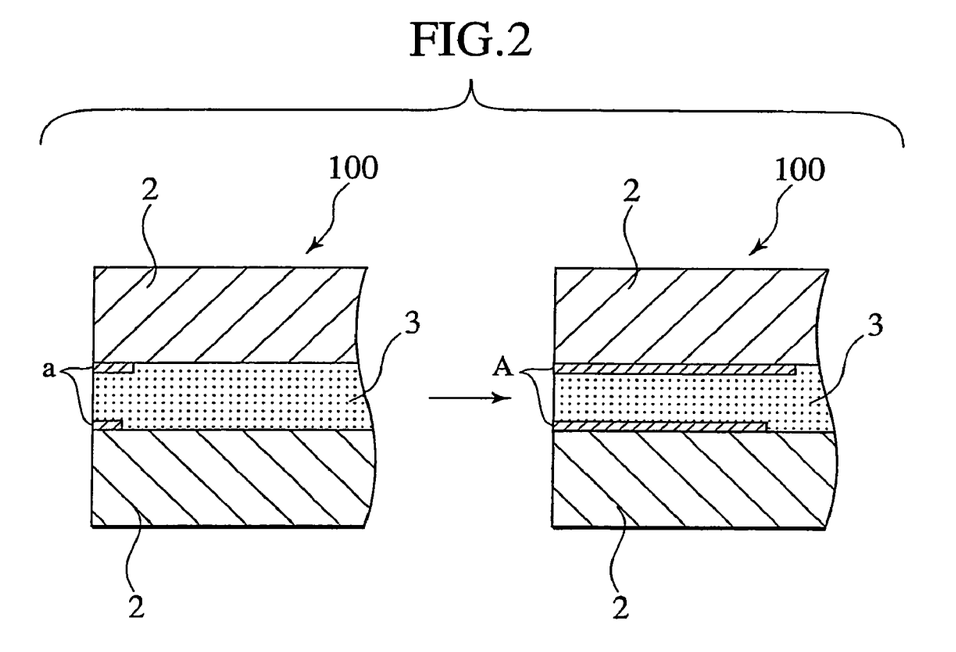
FIG. 2 is a cross-sectional schematic view for explaining how a crack develops in the conventional ceramic honeycomb structure body.

Specifically, cracks may occur in an interface between one of the honeycomb segments 2 and its corresponding one of the adhesive layers 3, stemming from an environment in which the ceramic honeycomb structure body 100 is in heavy use. In such a case, cracks a at the early stage will develop into splits A, as shown in FIG. 2. This causes reduction in adhesive strength. The ceramic honeycomb structure body 100 has the problem of this type.

Figure 3:
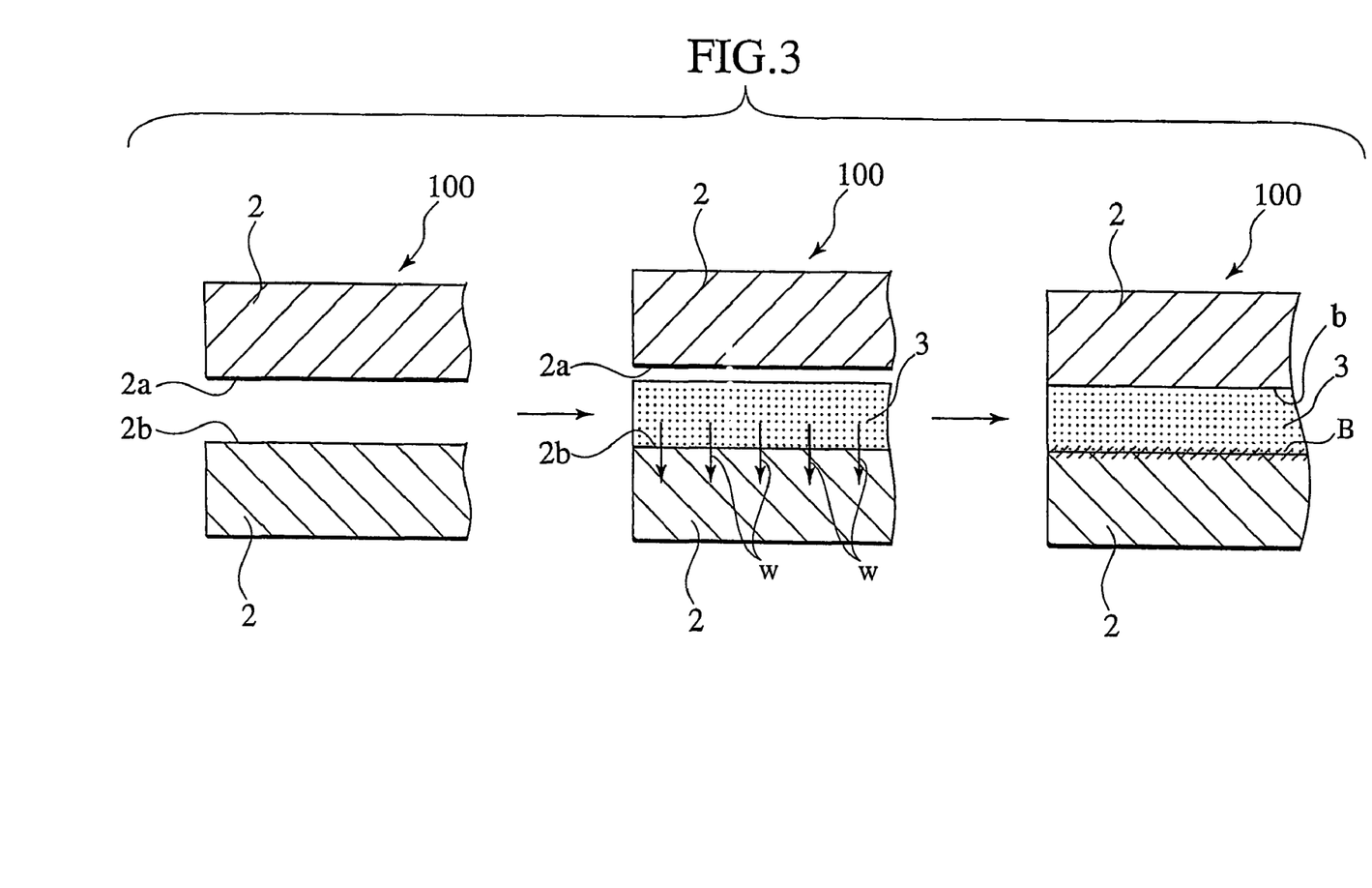
FIG. 3 is a cross-sectional view for explaining how an interface with high adhesive strength of the conventional ceramic honeycomb structure body is formed.

In addition, a step of adhering two honeycomb segments 2 and 2, opposite to each other, in the course of manufacturing the ceramic honeycomb structure body 100 is configured: to apply adhesive to one 2b of the two adhesion surfaces 2a and 2b respectively of the two honeycomb segments 2 and 2; thereby to form the adhesive layer 3; thereafter to press the other 2a of the two adhesion surfaces 2a and 2b against the adhesive layer 3; to adhere the two honeycomb segments 2 and 2, as shown in FIG. 3

Incidentally, in this adhering step, moisture movement w from the adhesive layer 3 to the honeycomb segment 2 through the adhesion surface 2b stems from the porosity of the honeycomb segment 2. This moisture movement w forms an interface B with high adhesive strength (a shadowed part in the figure) between the adhesive layer 3 and the adhesion surface 2b. However, this moisture movement w forms an interface b with low adhesive strength between the other surface of the adhesive layer 3 and the adhesion surface 2a, stemming from insufficient moisture. The ceramic honeycomb structure body 100 has another problem that the formation of this interface b with low adhesive strength reduces the overall adhesive strength of the adhesive layer 3.

With these problems taken into consideration, an object of the present invention is to provide a ceramic honeycomb structure body, whose adhesive layer is caused to have an improved adhesive strength by means of precluding cracks from developing into splits and by means of precluding moisture in the adhesive layer from moving to only one of the two opposed honeycomb segments 2, as well as a method of manufacturing the same.

DISCLOSURE OF THE INVENTION

In order to achieve the object, a first characteristic of the present invention lies in a ceramic honeycomb structure body including a configuration in which a plurality of porous honeycomb segments are bound one another with an adhesive layer interposed between each two neighboring porous honeycomb segments, where a plurality of protrusion portions fixed to one of the adhesion surfaces respectively of two honeycomb segments opposed to each other with the adhesive layer interposed between the two honeycomb segments are embedded into the adhesive layer.

In a case where the two adhesion surfaces are designated respectively by a first and a second adhesion surfaces, protrusion portions may be fixed to any one of the first and the second adhesion surfaces, or may be fixed to both of the first and the second adhesion surfaces. Protrusion portions to be fixed to the first adhesion surface are not in contact with the second adhesion surface. Similarly, protrusion portions to be fixed to the second adhesion surface are not in contact with the first adhesion surface.

According to the first characteristic of the present invention, development of cracks which have been caused in the adhesive is blocked by contact of the cracks with the protrusion portions. This prevents the cracks from developing into splits.

In addition, the embedment of the protrusion portions into the adhesive layer means the existence of the adhesive layer between a group of the protrusion portions and an adhesion surface of a honeycomb segment opposite to the group of the protrusion portions. As a consequence, the adhesive layer is fabricated by sequentially forming thicker portions of the adhesive layer to be formed between the adhesion surfaces respectively of the two honeycomb segments and thinner portions of the adhesive layer to be formed between each of the protrusion portions and its corresponding part of the opposed adhesion surface. An interface with high adhesive strength appears between each of the thicker portions of the adhesive layer and its corresponding adhesion surface of one of the two honeycomb segments, between which the adhesive layer is formed. In addition, another interface with high adhesive strength appears between each of the thinner portions of the adhesive layer and it corresponding adhesion surface of the other of the two honeycomb segments. Which interface of the two turns into an interface with high adhesive strength depends on whether or not the interface absorbs the moisture existing in the adhesive layer. In thinner portions of the adhesive layer, the parts of the adhesion surface opposite to the protrusion portions absorbs more of the moisture existing in the adhesive layer, thus turning into interfaces with high adhesive strength.

A second characteristic of the present invention lies in the ceramic honeycomb structure body including the first characteristic of the present invention, where the protrusion portions are fabricated of any one material selected out of inorganic materials and organic materials or of a combination of more than two materials selected out of the inorganic materials and the organic materials.

According to the second characteristic of the present invention, materials for the protrusion portions can be selected depending on an environment in which the ceramic honeycomb structure body is used.

In other words, in a case where the ceramic honeycomb structure body is used in an environment under mild conditions, no specific limitation is imposed on the selection of materials for the protrusion portions. For example, organic materials such as plastic and rubber, materials which are the same as those used for the honeycomb segments and the adhesive, inorganic materials including other ceramics, metals and the like can be used for the protrusion portions.

In a case where the ceramic honeycomb structure body is used in an environment under hard conditions (an environment involving the repetition of heating and cooling), the protrusion portions are fabricated of the same material as the honeycomb segments are fabricated in high density. This makes it possible to check thermal stress from occurring in the ceramic honeycomb structure body. In addition, since the protrusion portions are fabricated in high density, these protrusion protrusions can prevent the moisture existing in the adhesive layer from moving.

A third characteristic of the present invention lies in the ceramic honeycomb structure body including any one of the first and the second characteristics of the present invention, where the protrusion portions are fabricated so as to be 0.1 mm to 3.0 mm in thickness, and where the adhesive layer is formed in a way that the total of the thickness of each part of the adhesive layer in which to fix one of the protrusion portions and the thickness of the protrusion portion is 0.2 mm to 4.0 mm.

According to the third characteristic of the present invention if the total of the thickness of each of the parts of the adhesive layer to which to fix the protrusion portions respectively and the thickness of each of the protrusion portions is too large, this is not desirable since this makes the pressure loss of the honeycomb structure body larger. If the total of the thickness of each of the parts of the adhesive layer to which to fix the protrusion portions respectively and the thickness of each of the protrusion portions is too small, this is also not preferable since this reduces the adhesive strength. Each of the protrusion portions need to be at least 0.1 mm in thickness in order to preclude cracks from developing into splits.

A fourth characteristic of the present invention lies in the method of manufacturing the ceramic honeycomb structure body including any one of the first to the third characteristics of the present invention, where the adhesive layer is formed by applying the adhesive to one of the adhesion surfaces respectively of the two honeycomb segments to be adhered to each other, the adhesion surface to which to fix the protrusion portions, in a way that the protrusion portions are embedded into the adhesive, and thereafter the two honeycomb segments are adhered to each other by pressing the honeycomb segments against to each other, with the adhesive layer interposed between the honeycomb segments, in a direction which makes the gap between the opposing adhesion surfaces narrower.

According to the fourth characteristic of the present invention, an interface with high adhesive strength is formed between each of the parts of the adhesive layer corresponding to each of the parts to which to fix the respective protrusion portions in a first of the two honeycomb segments, between which the adhesive layer is formed, and its corresponding part of the adhesion surface of a second honeycomb segment. This is because the protrusion portions preclude the moisture from moving to the first honeycomb segment on which to form the adhesive layer, and accordingly, when the first honeycomb segment is adhered to the second one, the moisture moves to the second one. In contrast to this, another interface with high adhesive strength is formed between the parts of the adhesive layer to which to fix no respective protrusion portions in the second honeycomb segment and its corresponding parts of the adhesion surface of the first honeycomb segment. This is because the moisture moves to the second honeycomb segment.

In addition, a fifth characteristic of the present invention lies in the method of manufacturing the ceramic honeycomb structure body including the fourth characteristics of the present invention, where the protrusion portions are fixed to one of the two opposing adhesion surfaces and the other adhesion surface is formed so as to be flat, and where the adhesive layer is formed on the adhesion surface of the former adhesion surface.

According to the fifth characteristic of the present invention, an interface with high adhesive strength can be formed in an interface between each of the parts of the adhesive layer corresponding to each of the parts to which to fix the respective protrusion portions and its corresponding part of the latter adhesion surface, and, where an interface with high adhesive strength is formed between each of the parts of the adhesive layer corresponding to each of the spots to which to fix no respective protrusion portions and its corresponding part of the former adhesion surface.

Furthermore, a sixth characteristic of the present invention lies in the method of manufacturing the ceramic honeycomb structure body including the fourth characteristics of the present invention, where the protrusion portions are fixed to both of the two opposing adhesion surfaces, and where the adhesive layer is formed respectively on each of the adhesion surface.

According to the sixth characteristic of the present invention, the adhesion layers respectively on the adhesion surfaces are caused to abut to each other, and thereafter the adhesion layers are pressed against each other in a direction which makes the gap between the opposing adhesion surfaces narrower, accordingly enabling the two honeycomb segments to be adhered to each other. In this case, an interface with high adhesive strength to be formed on the adhesive layer is a part of the adhesion surface opposite to each of the protrusion portions with regard to the parts to which to fix the respective protrusion portions. An interface with high adhesive strength to be formed on the adhesive layer is a part of the adhesion surface to which the adhesive is applied with regard to the parts to which to fix no respective protrusion portions.

BEST MODE FOR CARRYING OUT THE INVENTION

Descriptions will be provided exemplarily for best modes for carrying out the present invention. Note that constituent components which are the same as those illustrated in FIGS. 1 to 3 are denoted by the same reference numerals, and accordingly brief descriptions will be provided for those constituent components.

Figure 4A:
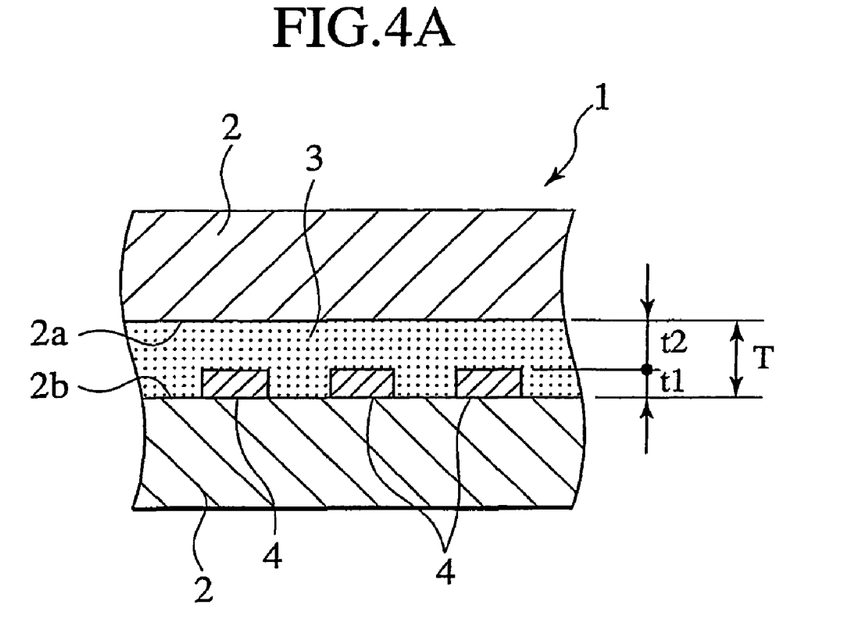
FIG. 4A is a cross-sectional view of a ceramic honeycomb structure body as an embodiment of the present invention.
Figure 4B:
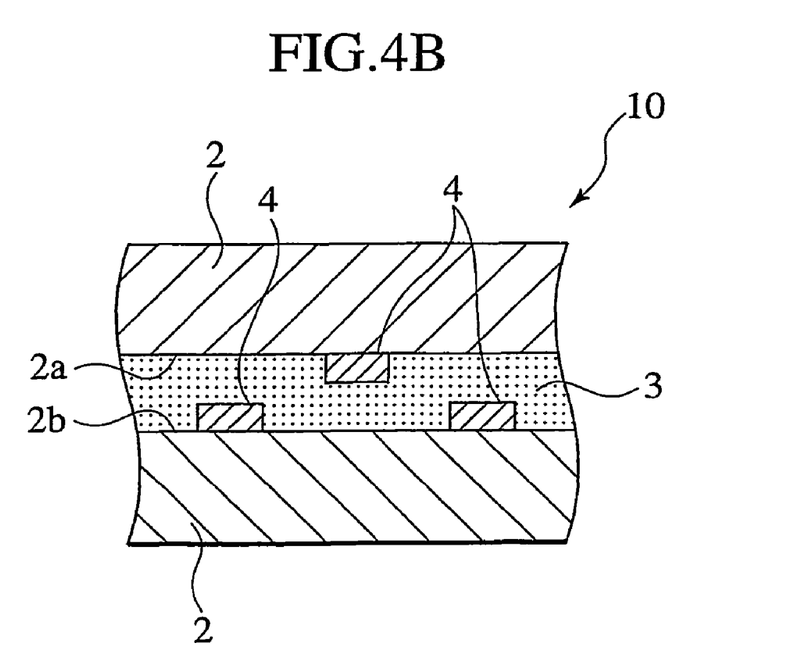
FIG. 4B is a cross-sectional view of a ceramic honeycomb structure body as another embodiment of the present invention.

FIG. 4A shows a ceramic honeycomb structure body 1 as a first embodiment of the present invention. FIG. 4B shows a ceramic honeycomb structure body 10 as a second embodiment of the present invention. Each of the ceramic honeycomb structure bodies 1 and 10 is configured by binding a plurality of porous honeycomb segments 2 to one another with an adhesive layer 3 interposed between each neighboring two of the porous honeycomb segments 2, which have a large number of circulation holes partitioned from one another by partition walls and penetrating through the honeycomb segments in their respective axial directions.

In this case, a plurality of protrusion portions 4 fixed to one of adhesion surfaces 2a and 2b respectively of the two honeycomb segments 2 and 2, opposite to each other with the adhesive layer 3 interposed therebetween, are embedded into the adhesive layer 3.

Specifically, it is preferable that the chief ingredient of the porous honeycomb segments 2 be made of SiC as well as any one of a ceramic, a Fe—Cr—Al group metal, a nickel group metal and metal Si, the ceramic which is selected out of silicon carbide, silicon nitride, cordierite, alumina, muraite, zirconium, zirconium phosphate, aluminum titanate and titanium as well as a group consisting of these compounds, from viewpoints of strength and heat resistance of the honeycomb segments. In this respect, the chief ingredient means an ingredient which takes up 80 mass % or more of the overall ingredients, and which is a main crystal phase.

Furthermore, with regard to the present invention, in a case where the honeycomb segments 2 are made of metal Si and SiC, it is preferable that a Si content defined by Si/(Si+SiC) be 5 to 50 mass %, and it is more preferable that the Si content be 10 to 40 mass %. The reasons for this are as follows. If the Si content is less than 5 mass %, it makes it difficult to obtain effects of addition of Si. If the Si content exceeds 50 mass %, it makes it difficult to obtain effects of thermal resistance and high thermal conductivity, which are characteristics of SiC.

No particular limitation is imposed on adhesive of which the adhesive layer 3 is formed. However, publicly-known adhesive may be used as long as the adhesive agrees with a material used for the honeycomb segments 2. In a case where the honeycomb segments 2 are made of metal Si and SiC, it is preferable that the adhesive be also made of a material containing at least one of metal Si and SiC. It is desirable that the adhesive be ceramic adhesive to be obtained by mixing, for example, inorganic fiber such as ceramic fiber, inorganic powder such as ceramic powder, organic/inorganic binder, and the like together. Moreover, it is preferable that the adhesive be made of adhesive containing a sol substance such as Si sol. Additionally, adhesives of a plurality of kinds may be used. In this case, it is also preferable that the adhesive layer 3 is formed of a plurality of layers. In a case where the adhesive layer 3 is formed of the plurality of layers, it is also preferable that compositions respectively of the adhesive layers in contact with the two honeycomb segments 2 be closely similar to a composition of the honeycomb segments 2, and that accordingly the compositions respectively of the plurality of the adhesive layers be changed one from another by causing one of the plurality of the adhesive layers to include a higher content of one of the ingredients.

The protrusion portions 4 are formed in high density by use of the almost same material as is used for the honeycomb segments 2 and the adhesive layer 3. Considering that the ceramic honeycomb structure bodies 1 and 10 are exposed to high temperature while being used, use of organic materials and metals is not preferable, since the organic materials and the metals are burned out, melt or evaporate at the high temperature. If the protrusion portions 4 are formed by use of the almost same material as is used for the honeycomb segments 2 and the adhesive layer 3, the protrusion portions 4 have, for example, a thermal expansion coefficient and a thermal conductivity coefficient, both of which are almost equal to those respectively of the honeycomb segments 2 and the adhesive layer 3. This makes it possible to inhibit occurrence of thermal stress even in an environment involving the repetition of heating and cooling. For this reason, it is preferable that the protrusion portions 4 are formed by use of the same material as is used for the honeycomb segments 2 and the adhesive layer 3. In addition, if the protrusion portions 4 are formed in high density, movement of the moisture from the adhesion layer 3 can be precluded by the protrusion portions 4.

In the case of the honeycomb structure body 1, the protrusion portions 4 are fixed to the adhesion surface 2a of one of the two honeycomb segments 2 (see FIG. 4A). In the case of the honeycomb structure body 10, the protrusion portions 4 are fixed to both of the adhesion surfaces 2a and 2b respectively of the two honeycomb segments 2 and 2 (see FIG. 4B).

Specifically, the protrusion portions 4 can be fixed to the adhesion surface 2b (or 2a) of one of the two honeycomb segments 2 through the following process. A base layer is formed on the adhesion surface 2b (or 2a). Then, an equivalent to the adhesive layer 3 to be applied later is applied onto the base layer with a desirable thickness and in desired positions. Thereafter, the base layer and the equivalent to the adhesive layer 3 are heated and dried.

In addition, the protrusion portions 4 are arranged on the adhesion surface of the honeycomb segment 2 in the following manner. FIGS. 5A to 6C respectively show examples of arrangement of the protrusion portions 4. In addition, each of FIGS. 5A to 6C shows planar shapes respectively of the protrusion portions and a positional relationship among the protrusion portions no matter which adhesion surface, out of the two adhesion surfaces respectively of the two honeycomb segments 2 and 2, the protrusion portions 4 may be fixed to. In FIGS. 5A to 6C, the protrusion portions 4 are shadowed by oblique lines.

Figure 5A:
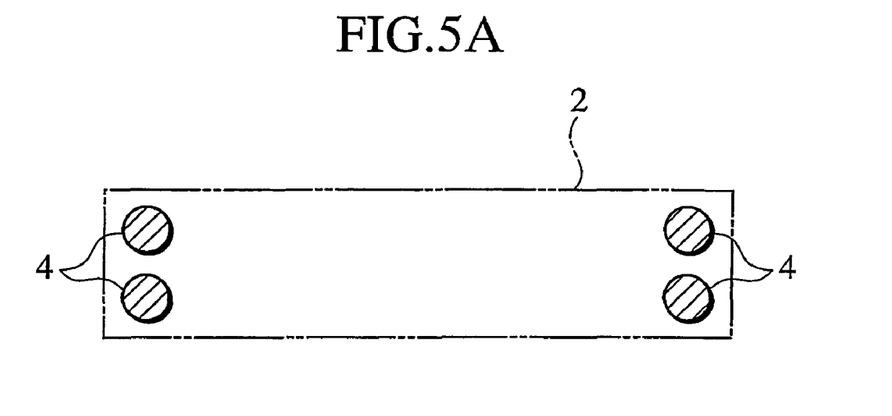
FIGS. 5A, 5B and 5c are plan schematic views respectively showing examples of arrangement of protrusion portions in an adhesion surface of the honeycomb segment according to the present invention.
Figure 5B:
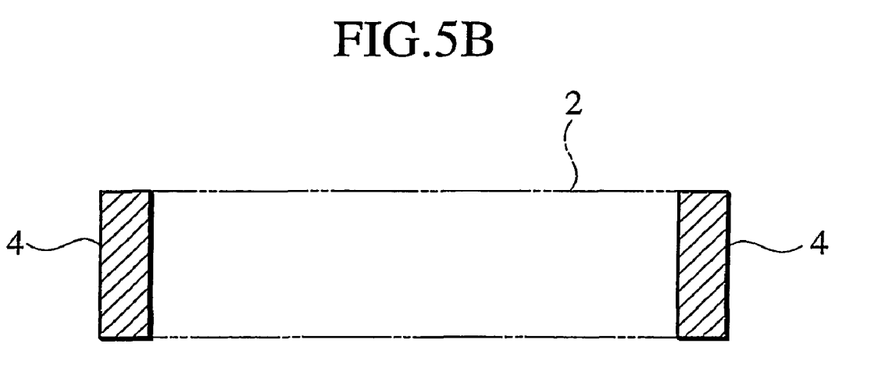
Figure 5C:
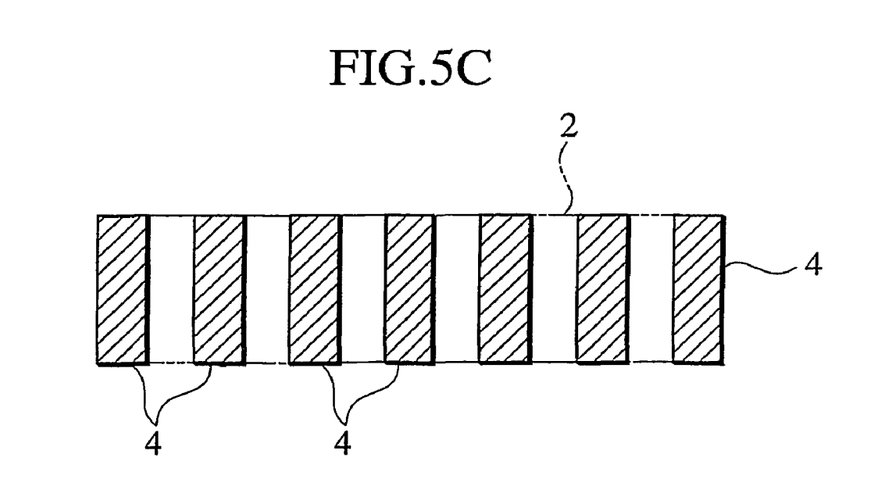

In other words, each of the protrusion portions 4 is shaped like a circle in terms of its planar shape in FIG. 5A. Two protrusion portions are fixed to each of the two opposite end sides of one of the two honeycomb segments 2 in the longitudinal direction. In FIG. 5B, each of the protrusion portions 4 is shaped like a rectangle, whose width is equal to that of one of the two honeycomb segments 2, in terms of its planar shape. One protrusion portion is fixed to each of the two opposite end sides of one of the two honeycomb segments 2 in the longitudinal direction. In FIG. 5C, each of the protrusion portions 4 is shaped like a rectangle, whose width is equal to that of one of the two honeycomb segments 2, in terms of its planar shape. A large number of protrusion portions 4 (seven protrusion portions in this example) are fixed to one of the two honeycomb segments 2 at approximately equal intervals in the longitudinal direction of the honeycomb segment 2.

Figure 6A:
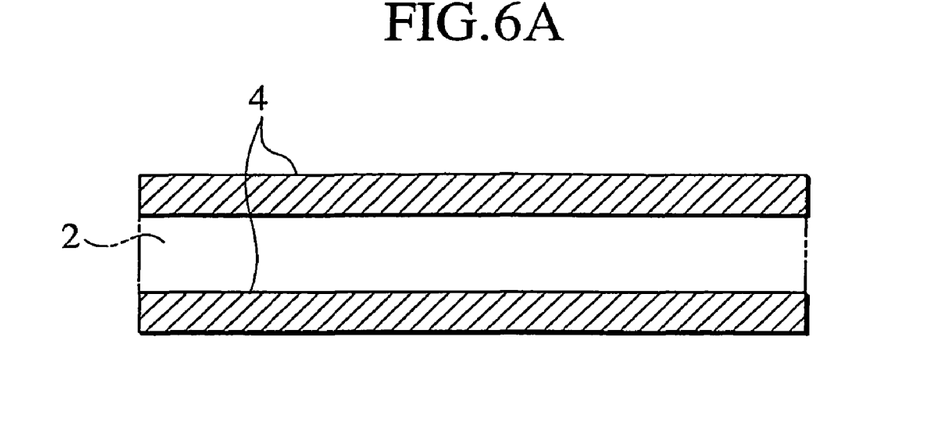
FIGS. 6A, 6B and 6C are plan schematic views respectively showing other examples of arrangement of the protrusion portions in the adhesion surface of the honeycomb segment according to the present invention.

Additionally, in FIG. 6A, each of the protrusion portions 4 is shaped like a band, whose length is equal to that of one of the two honeycomb segments 2 in the longitudinal direction, in terms of its planar shape. One protrusion portion is fixed to each of the two opposite end sides of one of the two honeycomb segments 2 in the width direction. In this case, an effect can be expected, in which the two end side portions of the honeycomb segment 2 in the width direction block cracks which would otherwise develop in the width direction of the honeycomb segment 2.

Figure 6B:
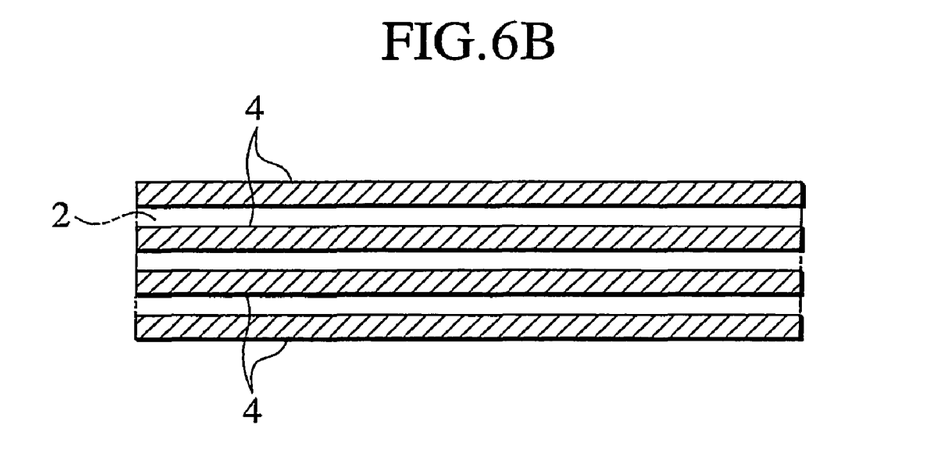

In FIG. 6B, each of the protrusion portions 4 is shaped like a band, whose length is equal to that of one of the two honeycomb segments 2 in the longitudinal direction, in terms of its planar shape. A large number of protrusion portions (four protrusion portions in this example) are fixed to one of the two honeycomb segments 2 at approximately equal intervals in the width direction of the honeycomb segment 2. In this case, an effect can be expected, in which the two end side portions and middles of the honeycomb segment 2 in the width direction block cracks which would otherwise develop in the width direction of the honeycomb segment 2.

Figure 6C:
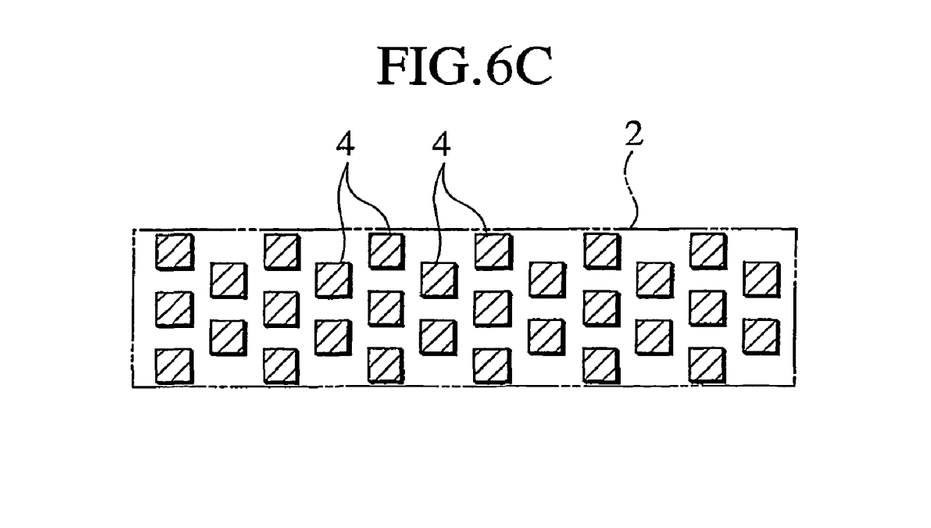

In FIG. 6C, each of the protrusion portions 4 is shaped like a small square in terms of its planar shape. A large number of protrusion portions (30 protrusion portions in this example) are fixed to the entire adhesion surface of one of the two honeycomb segments 2 in a staggering manner. In this case, an effect can be expected, in which middles of the honeycomb segment 2 in both the width and the longitudinal directions block cracks which would otherwise develop in the honeycomb segment 2.

Figure 7A:
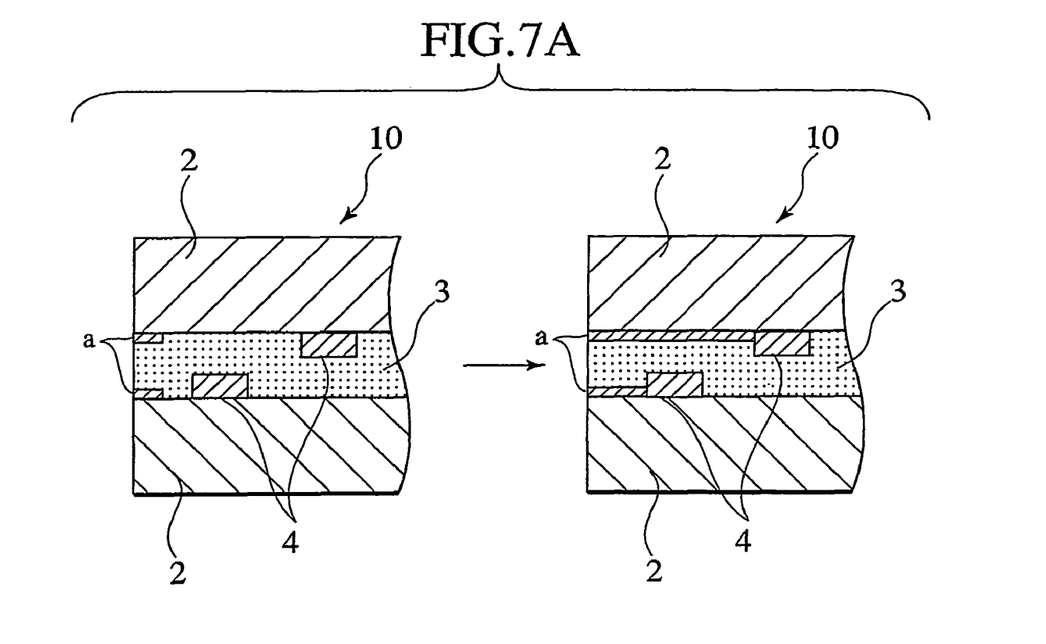
FIG. 7A is a cross-sectional schematic view for explaining how a crack develops in the ceramic honeycomb structure body according to the present invention.

In the case of the ceramic honeycomb structure body 10, as shown in FIG. 7A, the two honeycomb segments of which are configured in the aforementioned manners, development of cracks a which have been caused in the adhesive layer 3 are blocked when the cracks reach the protrusion portions 4. This blockage can preclude the crack from developing into splits. Similarly, the protrusion portions 4 can block development of cracks, and this blockage can preclude the cracks from developing into splits, in the case of the ceramic honeycomb structure body 1.

Figure 7B:
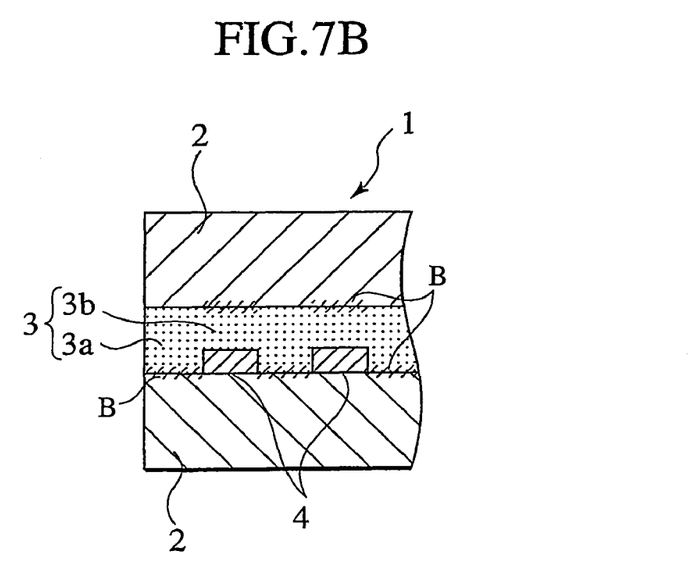
FIG. 7B is a cross-sectional schematic view for explaining an interface with high adhesive strength of the ceramic honeycomb structure body of the present invention.

In addition, as shown in FIG. 7B, a thicker portion 3a of the adhesive layer 3 formed between the adhesion surfaces respectively of the two honeycomb segments 2 and 2 as well as a thinner portion 3b of the adhesive layer formed between one of the protrusion portions 4 and its corresponding part of the adhesion surface are fabricated repeatedly in the adhesion layer 3 of the ceramic honeycomb structure body 1. An interface B with high adhesive strength (shadowed by oblique lines in FIG. 7B) appears in an interface between each thick portion 3a and its corresponding portion of the adhesion layer of one of the two honeycomb segments 2 on which the adhesion layer 3 is formed. An interface B with high adhesive strength appears in an interface between each thinner portion 3b and its corresponding portion of the adhesion layer of the other honeycomb segment 2, the corresponding portion being opposite to one of the protrusion portions 4. "One of the two honeycomb segments 2 on which the adhesive layer is formed" means the honeycomb segment 2 having the protrusion portions 4 (the honeycomb segment 2 at the bottom in FIG. 7B).

In general, adhesive strength of the adhesive layer 3 can be improved as described above, in the cases of the ceramic honeycomb structure bodies 1 and 10. This is because the protrusion portions 4 block the development of the cracks a, and because the protrusion portions 4 cause the interface B with high adhesive strength to appear in the adhesion surfaces respectively of the honeycomb segments 2 and 2.

Furthermore, in the cases of the ceramic honeycomb structure bodies 1 and 10, it is preferable that the thickness t1 of each of the protrusion portions 4 as shown in FIG. 4A be 0.1 mm to 3.0 mm, and that the adhesive layer 3 be formed in a way that the adhesion width T of the adhesive layer 3 totaling the thickness t2 of each part of the adhesive layer 3 in which to fix one of the protrusion portions 4 and the thickness t1 of the protrusion portion 4 is 0.2 mm to 4.0 mm. The thickness t2 is a thickness of the thinner portion 3b.

This configuration makes it possible to avoid increase in pressure loss while the ceramic honeycomb structure bodies 1 and 10 are being used, and concurrently to improve the adhesive strength of the adhesive layer 3. It is not preferable that a total of the thickness of the adhesive layer 3 and the thickness of each of the protrusion portions 4 is too large. This is because it increases the pressure loss of each of the honeycomb structure bodies 1 and 10. It is not preferable that the total of the thickness of the adhesive layer 3 and the thickness of each of the protrusion portions 4 is too small. This is because it reduces the adhesive strength of each of the honeycomb structure bodies 1 and 10.

Next, descriptions will be provided for a method of manufacturing the ceramic honeycomb structure bodies 1 and 10.

In the method of manufacturing the honeycomb structure bodies according to the present invention, first of all, a honeycomb segment 2 is formed. No specific limitation is imposed on a process of manufacturing the honeycomb segment 2. In general, a method of manufacturing what includes a ceramic honeycomb structure body can be used for the process of manufacturing the honeycomb segment 2. The honeycomb segment 2 can be manufactured through the following process.

What are used as the materials for the honeycomb segments 2 are SiC as well as any one of a ceramic, a Fe—Cr—Al group metal, a nickel group metal and metal Si, the ceramic which is selected out of silicon carbide, silicon nitride, cordierite, alumina, muraite, zirconia, zirconium phosphate, aluminum titanate and titania as well as a group consisting of these compounds. Binder such as methylcellulose and hydroxypropoxyl methylcellulose, a surface-active agent, water and the like are added to the materials. Thereby, a plastic ceramic body material is made.

This ceramic body material is molded, for example by an extrusion molding process, into honeycomb molded bodies having a large number of the circulation holes 102 which are partitioned from one another by partition walls, which penetrate through the honeycomb molded body in their respective axial directions (see FIG. 1).

The honeycomb molded bodies are dried, for example, by use of microwaves, hot air or the like. Thereafter, the honeycomb molded bodies are fired. Thereby, the honeycomb segments 2 as shown in FIG. 1 can be fabricated.

In the case of the present invention, after the honeycomb segments 2 are fabricated, the protrusion portions 4 are fixed to the adhesion surfaces respectively of these honeycomb segments 2. Thereafter, the honeycomb segments 2 to which the protrusion portions 4 have been fixed are adhered with each other, and accordingly the honeycomb segments 2 are united into a single body. The manufacturing method according to the present invention features the process from the step of fixing the protrusion portions 4 to the honeycomb segments through the step of adhering the honeycomb segments with each other and uniting them into the single body.

First, descriptions will be provided for the step of fixing the protrusion portions 4 to the honeycomb segments. When the protrusion portions 4 are intended to be fixed to the adhesion surface(s), a pattern in which the protrusion portions 4 are arranged is selected out of the patterns as shown in FIGS. 5A to 6C depending on the necessity. This step is a step of fixing the protrusions 4 onto the adhesion surface 2b (or the adhesion surface 2a, or both of the adhesion surfaces 2a and 2b). An agent for forming the protrusion portions 4 is arranged in each of predetermined parts of the adhesion surface 2b (or the adhesion surface 2a, or both of the adhesion surfaces 2a and 2b) to which to form the respective protrusion portions 4 in a predetermined amount, and is heated and dried. This enables the protrusion portions 4 to be fixed to the adhesion surface 2b (or the adhesion surface 2a, or both of the adhesion surfaces 2a and 2b). It is preferable that the agent for forming the protrusion portions 4 be fluid, and that the fluid agent for forming the protrusion portions 4 be arranged in the predetermined parts, thereafter hardened, and thereby fixed to the adhesion surface(s). It is preferable that the method of arranging the agent for forming the protrusion portions 4 in the predetermined parts be a method of arranging the agent in the predetermined parts of the adhesion surface(s) in the predetermined amount, for example, by use of a pump which can always discharge the agent in a certain amount. It is preferable that the method of fixing the arranged spots of the agent for forming the protrusion portions 4 to the adhesion surface(s) and thereby forming the protrusion portions 4 be a method of fixing the arranged spots of the material for forming the protrusion portions 4 to the adhesion surface(s) by means of a heating process and a drying process. In order to carry out the method, a variety of commonly-used heating systems, drying systems and thermal drying systems can be used. In this regard, it is preferable that the arranged spots of the agent for forming the protrusion portions 4 be heated and/or dried while being pressurized in order that the protrusion portions 4 may be formed with the predetermined thickness. Incidentally, if necessary, a base agent may be applied to the adhesion surface 2b (or the adhesion surface 2a, or both the adhesion surfaces 2a and 2b) by use of a spraying process before the agent for forming the protrusion portions 4 are arranged. The application of the a base agent makes it possible to improve the adhesive strength with which the adhesion surface and each of the protrusion portions 4 are adhered to each other.

Next, descriptions will be provided for the step of adhering the honeycomb segments to each other and uniting them into a single body. In this step, as shown in FIG. 5, the adhesive is applied to the adhesion surface 2b in a way that the protrusion portions 4 are embedded in the adhesive, and thereby the adhesive layer 3 is formed, in the case where the protrusion portions 4 are fixed to only the adhesion surface 2b out of the opposing adhesion surfaces 2a and 2b respectively of the two honeycomb segments 2 and 2, which are adhered with each other. Otherwise, as shown in FIG. 8B, the adhesives are applied respectively to the adhesion surfaces 2a and 2b in a way that the protrusion portions 4 fixed to the adhesion surface 2a are embedded in the adhesive applied to the adhesion surface 2a and the protrusion portions 4 fixed to the adhesion surface 2b are embedded in the adhesive applied to the adhesion surface 2b, and thereby the adhesive layer 3 is formed, in the case where the protrusion portions 4 are fixed to both the opposing adhesion surfaces 2a and 2b respectively of the two honeycomb segments 2 and 2, which are adhered with each other. In both cases, after the adhesive layer 3 is formed, the two honeycomb segments are pressed against each other, with the adhesive layer 3 interposed between the two honeycomb segments, in a direction which makes the gap between the opposing adhesion surfaces 2a and 2b narrower (in a direction indicated by arrows P in FIGS. 8A and 8B). Thus, the two honeycomb segments are adhered to each other. Furthermore, a stronger adhesive strength can be obtained depending on the type of the adhesive, if the honeycomb segments thus adhered to each other are additionally dried and/or fired. "The adhesive is applied in a way that the protrusion portions 4 are embedded in the adhesive" means that the adhesive is applied in an amount which causes the entire shape of each of the protrusion portions 4 to be hidden in the adhesive layer 3.

Figure 8A:
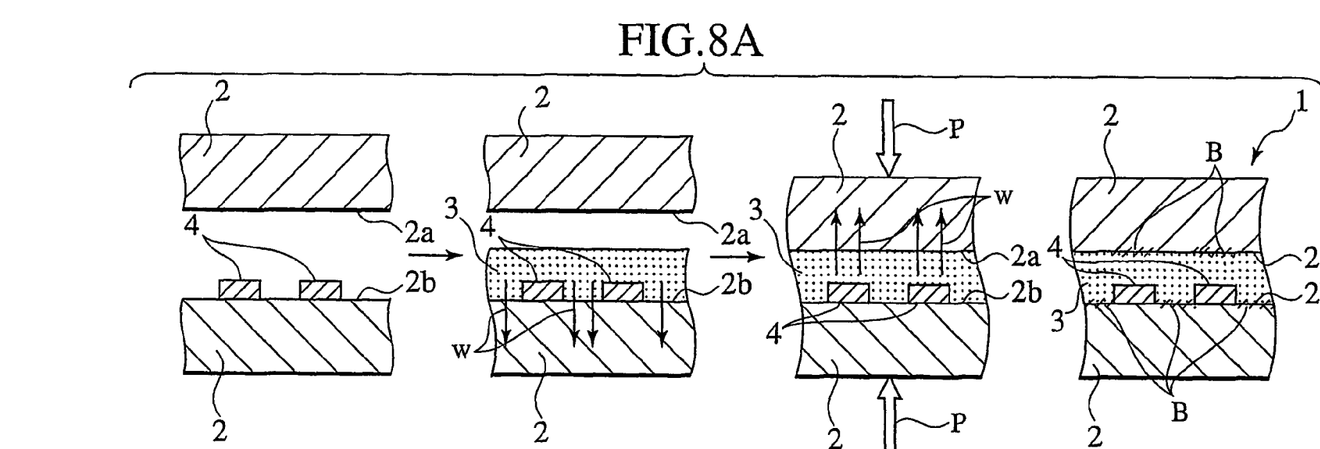
FIGS. 8A and 8B are cross-sectional schematic views respectively for explaining how the interface with high adhesive strength of the ceramic honeycomb structure body according to the present invention is formed.
Figure 8B:
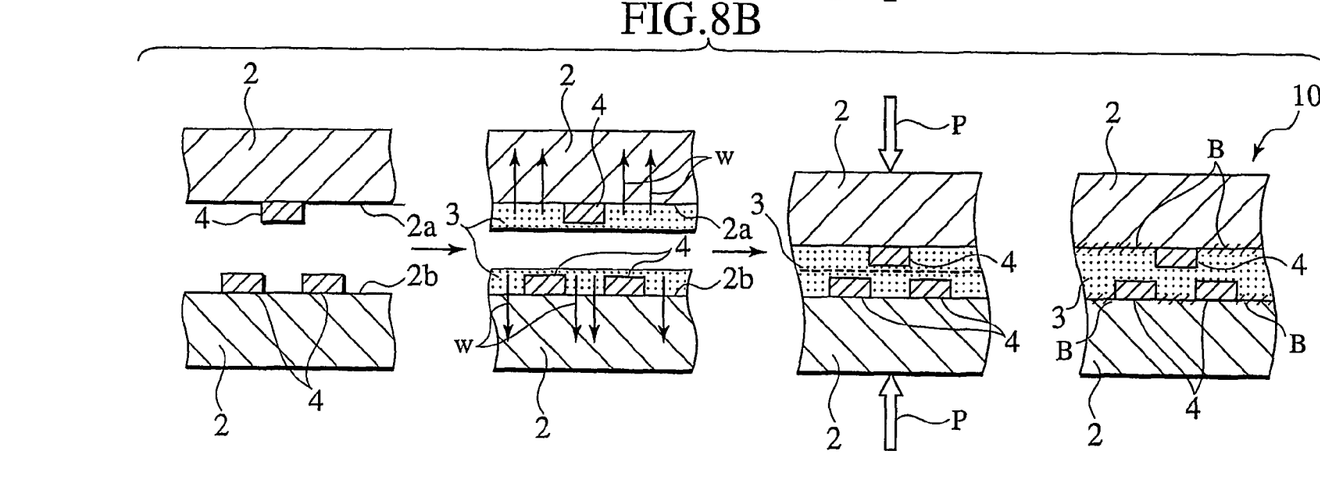

In the case of the manufacturing method shown in FIG. 8A, the protrusion portions 4 are formed in the adhesion surface 2b of one honeycomb segment 2, and the adhesion surface 2a of the other honeycomb segment 2 is formed so as to be flat. In this case, the adhesive layer 3 is formed on only the adhesion surface 2b. The aforementioned ceramic adhesive agent can be used as the adhesive for the adhesive layer 3 in this case. After the adhesive layer 3 is formed, as shown by arrows w in FIG. 8A, moisture moves, through parts of the adhesion surface 2b to which to fix no respective protrusion portions 4, from the adhesive layer 3 to the honeycomb segment 2 to which the protrusion portions 4 have been fixed, until the other honeycomb segment 2 is adhered thereto. At this time, in parts of the adhesion surface 2b to which to fix the protrusion portion 4 respectively, moisture movement w does not occur since the protrusion portions 4 block the moisture movement w. Thereafter, the adhesion surface 2a is caused to abut on the adhesive layer 3, and thus the other honeycomb segment 2 is adhered thereto. Consequently, as shown in arrows w, moisture moves to the honeycomb segment 2 which has just been adhered thereto from parts of the adhesive layer 3 corresponding to the parts of the adhesion surface 2 to which to fix the respective protrusion portions 4, through the adhesion surface 2a. In the case of the ceramic honeycomb structure body 1 thus manufactured, interfaces B with high adhesive strength (shadowed by oblique lines in FIG. 8A) appear in both of the adhesion surfaces 2a and 2b, stemming from the moisture movements indicated by the arrows w.

In other words, an interface between each of the thicker portions of the adhesive layer and its corresponding part of the adhesion surface of the honeycomb segment to which the protrusion portions 4 are fixed (the honeycomb segment at the bottom in each illustration of FIG. 8A) is turned into the interface with high adhesive strength. An interface between each of the thinner portions of the adhesive layer and its corresponding part of the adhesion surface of the honeycomb segment to which no protrusion portions are fixed is turned into the interface with high adhesive strength.

Moreover, in the case of the manufacturing method as shown in FIG. 8B, the protrusion portions 4 are formed in the adhesion surfaces 2a and 2b respectively of the two honeycomb segments 2 and 2. In this case, the adhesive layer 3 is formed on each of the adhesion surfaces 2a and 2b by applying the adhesive to each of the adhesion surfaces 2a and 2b in a way that the protrusion portions 4 fixed to the adhesion surface 2a are embedded in the adhesive applied to the adhesion surface 2a and the protrusion portions 4 fixed to the adhesion surface 2b are embedded in the adhesive applied to the adhesion surface 2b. After the adhesive layers 3 are formed, as shown by arrows w, moisture moves from the upper adhesive layer 3 to the upper honeycomb segment 2 through parts of the adhesion surface 2a to which to form no respective protrusion portions, and moisture moves from the lower adhesive layer 3 to the lower honeycomb segment 2 through parts of the adhesion surface 2b to which to form no respective protrusion portions. At this time, in parts of the adhesion surfaces 2a and 2b to which to fix the protrusion portion 4 respectively, moisture movement w does not occur since the protrusion portions 4 block the moisture movement w. Thereafter, the adhesive layers 3 are caused to abut on each other, and thus the two honeycomb segments 2 are adhered to each other. In the case of the ceramic honeycomb structure body 10 thus manufactured,. interfaces B with high adhesive strength (shadowed by oblique lines in FIG. 8B) appear in both of the adhesion surfaces 2a and 2b, stemming from the moisture movements indicated by the arrows w.

An interface between each of the thicker portions of the adhesive layer and its corresponding part of the adhesion surface to which to fix no protrusion portion 4 is turned into the interface with high adhesive strength. In addition, an interface between each of the thinner portions of the adhesive layer and its corresponding part of the adhesion surface to which to fix no protrusion portion 4 is turned into the interface with high adhesive strength.

In the case of the manufacturing method thus configured according to the present invention, the protrusion portions 4 block moisture movement w from parts of the adhesive layer 3 corresponding to the parts of the adhesion surface to which to fix the respective protrusion portions 4 toward one honeycomb segment 2 on which the adhesive layer 3 is formed. When the other honeycomb segment 2 is adhere thereto, moisture movement w to the honeycomb segment 2 occurs. The interface B with high adhesive strength is formed between each of the parts of the adhesive layer 3 corresponding to the parts of the adhesion surface to which to fix the respective protrusion portions 4 and the adhesion surface 2a (or 2b) of the latter honeycomb segment 2. In contrast to this, moisture movement w occurs from parts of the adhesive layer 3 to which to fix no respective protrusion portions 4 toward one honeycomb segment 2 on which the adhesive layer 3 is formed. Accordingly, the interface B with high adhesive strength are formed between each of the parts of the adhesive layer 3 to which to fix no respective protrusion portions 4 and the adhesion surface 2b (or 2a) of the honeycomb segment 2.

In the case of the manufacturing method according to the present invention, the interfaces B with high adhesive strength can be realized in the adhesion surfaces 2a and 2b respectively of the two honeycomb segments 2 and 2, which are adhered to each other, by use of the protrusion proportions 4. This makes it possible to improve adhesive strength of the adhesive layer 3.

Next, descriptions will be provided for an example of experiment on the adhesive strength of the adhesive layer 3.

EXPERIMENTAL EXAMPLE 1

Figure 9:
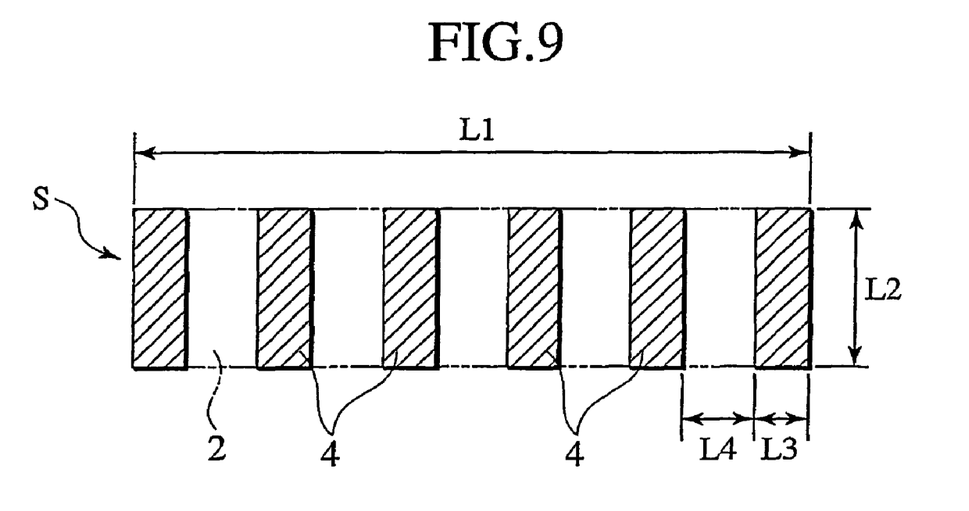
FIG. 9 is a plan schematic view of a honeycomb segment constituting a honeycomb structure body as a test sample, which has been used for a shearing-strength measuring method.

A honeycomb structure body S as a test sample was formed in the following steps. As shown in FIG. 9, the protrusion portions 4 was fixed to only one of the two honeycomb segments 2 in accordance with the arrangement example as shown in FIG. 5C, and the adhesion surface of the other honeycomb segment 2 was formed so as to be flat. The adhesive layer 3 was applied, with a thickness of 1 mm, to the adhesion surface to which the protrusion portions 4 are fixed. Thereafter, the latter honeycomb segment 2 was adhered to the former honeycomb segment 2. Then, the honeycomb segments 2 were dried at 100° C. for 30 minutes while pressurized to 1.0 kgf/cm. The honeycomb structure body S as the test sample was formed so as to have the adhesive surface which was a rectangle with a length L1=150 mm and a width L2=35 mm. Each of the protrusion portions 4 was formed so as to be shaped like a rectangle, which had a length L2=35 mm and a width L3=10 mm. Eight (8) protrusion portions were provided in the adhesion surface 4 with a clearance L4=10 mm between each neighboring two of the protrusion portions 4. Incidentally, FIG. 9 shows only six (6) protrusion portions 4 for the simplification purpose.

In addition, the honeycomb structure body S as the test sample was configured with the following thicknesses of each of the protrusion portions 4: 0.1 mm (Example 1), 0.5 mm (Example 2) and 1.0 mm (Example 3). In this case, a honeycomb structure body which had no protrusion portions was used for Comparative Example. Except for the absence of the protrusion portions, the honeycomb structure body to be used for the comparative example was configured in the same conditions as the honeycomb structure body S as the examples was configured.

Figure 10:
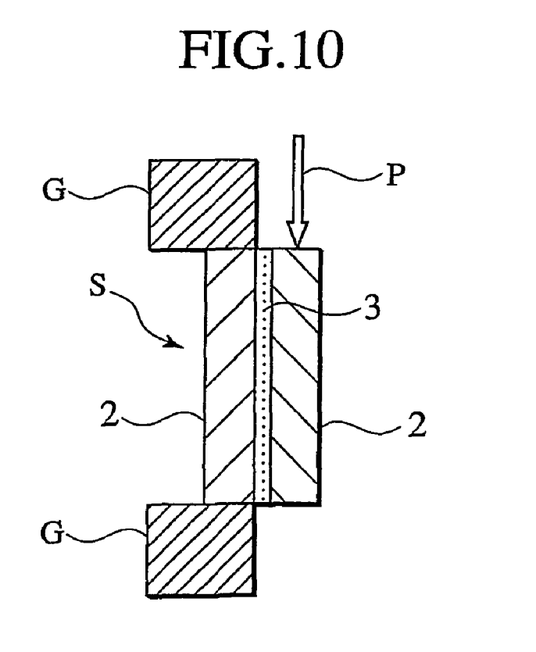
FIG. 10 is a cross-sectional schematic view for explaining the shearing-strength measuring method.

Method for carrying out the experiment: As shown in FIG. 10, one of the two honeycomb segments 2 was supported by interposing the honeycomb segment 2 between the chucks G and G (the space therebetween was 35 mm), and pressure P was applied to the other honeycomb segment 2. Thereby, shearing strength of each of the honeycomb structure bodies was measured.

Result of the experiment: The shearing strength of each of the honeycomb structure bodies respectively as Comparative Example, and Examples 1 to 3 was measured five times. Table 1 shows the measurement values and the average values.

TABLE 1

|  | THICKNESS (mm) | SHEARING STRENGTH (kPa) | | | | | AVERAGE |
| --- | --- | --- | --- | --- | --- | --- | --- |
| COMPARATIVE EXAMPLE | NO PROTRUSION PORTION | 163 | 152 | 157 | 164 | 148 | 157 |
| EXAMPLE 1 | THICKNESS OF PROTRUSION PORTION OF 0.1 | 181 | 190 | 228 | 215 | 198 | 202 |
| EXAMPLE 2 | THICKNESS OF PROTRUSION PORTION OF 0.5 | 315 | 306 | 310 | 346 | 322 | 320 |
| EXAMPLE 3 | THICKNESS OF PROTRUSION PORTION OF 1.0 | 192 | 213 | 143 | 226 | 184 | 192 |

As clearly understood from Table 1, the honeycomb structure body exhibited sufficient strength in the case where the protrusion portions 4 had the thickness set for Example 2. Strength exhibited by the honeycomb structure body with no protrusion portions 4 (Comparative Example) was lower than those exhibited respectively by the other honeycomb structure body with the protrusion portions 4 (Examples 1 and 3). As a consequence, it can be understood that the honeycomb structure bodies with the protrusion portions 4 have higher strength than the honeycomb structure body with no protrusion portions 4.

Experiment 2

Figure 11A:
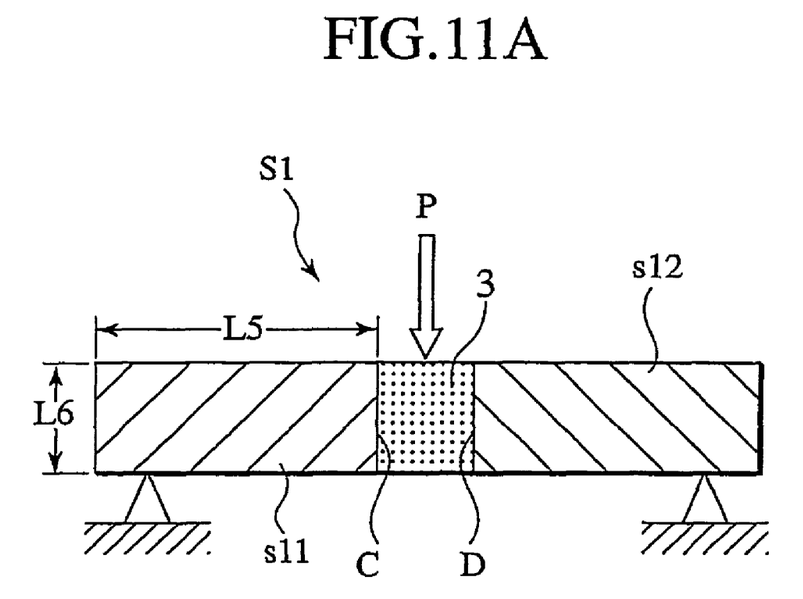
FIGS. 11A and 11B are cross-sectional schematic views for explaining a three-point bending-strength measuring method.

A honeycomb structure body S1 as a test sample was formed by uniting test pieces s11 and s12, each measuring 71 mm×30 mm×15 mm, with the adhesive layer 3 interposed between the test pieces, as shown in FIG. 11A. In the illustration representing this honeycomb structure body S1, reference symbol C denotes a coated interface; and D, an adhered interface.

Test pieces s21 and s22, each measuring 71 mm×30mm×15 mm, were used for a honeycomb structure body S2 as a test sample. The honeycomb structure body S2 was formed by fixing the protrusion portion 4 to the test piece s21, and by uniting the protrusion portion 4 and the other test piece s22 with the adhesive layer 3 interposed between the protrusion portion 4 and the test piece s22, as shown in FIG. 11B.

Figure 11B:
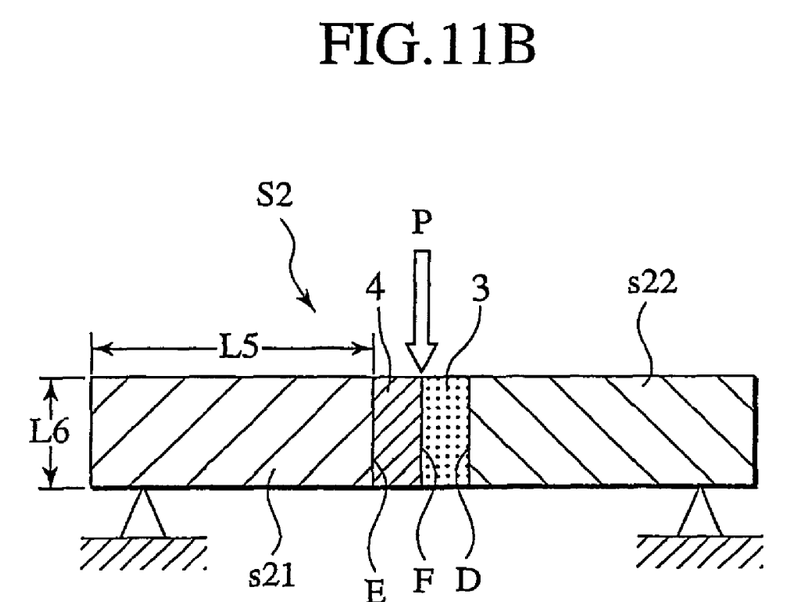

FIGS. 11A and 11B, a length L5 was 71 mm, and a length L6 was 30 mm.

In the illustration representing the honeycomb structure body S2 as the test sample, reference symbol D denotes an adhesive-segment interface; E, a segrent-protrusion portion interface; and F, a protrusion portion-adhesive interface.

Method of Carrying out the Experiment: When a three-point bending-strength measuring method was performed on the honeycomb structure body shown in FIG. 11A, load P was imposed on the center portion of the adhesive layer 3, and thereby strength was measured (Level 1). When the three-point bending-strength measuring method was performed on the honeycomb structure body shown in FIG. 11B, load P was imposed on the protrusion portion-adhesive interface F (Level 2).

Result of the Experiment: The strengths respectively in the cases of Levels 1 and 2 were measured ten times. Table 2 shows the measurement values, the maximum values, the minimum values, the average values and the standard deviations As clearly understood from Table 2, the adhesive-segment interface D was broken in terms of the adhesive strength to be applied in the case of Level 1 including no protrusion portions 4 (FIG. 11A). In the case of Level 2 including the protrusion portions 4 (FIG. 11B), there existed an interface with high adhesive strength, and accordingly, in some cases, the protrusion portion-adhesive interface F was likely to be relatively weak so that the protrusion portion-adhesive interface F was broken. Comparison between Levels 1 and 2 showed that Level 2 including the protrusion portions 4 had a higher strength than Level 1 including no protrusion portions 4 had in terms of all of the maximum value, minimum value and average value. As a consequence, it can be understood that, preferably, the protrusion portions 4 are provided to the honeycomb structure body so as to improve the adhesive strength

INDUSTRIAL APPLICABILITY

According to the first characteristic of the present invention, the ceramic honeycomb structure body can be provided, where the development of cracks and the movement of moisture from the adhesive layer are inhibited as much as possible, and where accordingly the adhesive strength of the adhesive layer can be improved.

According to the second characteristic of the present invention, the material for the protrusions can be made as suitable as possible, and accordingly the material for the protrusions free from defects and high-temperature physical properties of the ceramic honeycomb structure body and the adhesive can be obtained in addition to the effects of the present invention as described in claim 1.

According to the third characteristic of the present invention, the protrusions can be arranged between each neighboring two of the honeycomb segments, and concurrently the adhesive layer between each neighboring two of the honeycomb segments can be caused to have a desired thickness, accordingly enabling the pressure loss to be inhibited from increasing and enabling the adhesive strength of the adhesive layer to be improved in addition to the effects of the present invention as described in any one of claims 1 and 2.

According to the fourth characteristic of the present invention, the ceramic honeycomb structure body including the first characteristic of the present invention can be manufactured securely.

According to the fifth characteristic of the present invention, the interface with high adhesive strength can be formed between each of the portions of the adhesive layer, corresponding to one of the parts of one adhesion surface to which

TABLE 2

| | | THREE-POINT BENDING STRENGTH (kPa) | | | | | | | | | | | | | |
|---|---|---|---|---|---|---|---|---|---|---|---|---|---|---|---|
| | | SAMPLE NUMBER | | | | | | | | | | | | | |
| | | 1 | 2 | 3 | 4 | 5 | 6 | 7 | 8 | 9 | 10 | max | min | AVE | σ |
| LEVEL 1 | PORTIONS ADHERED IN CONVENTIONAL MANNER (INCLUDING NO PROTRUSION PORTION) | 22 | 60 | 45 | 52 | 42 | 97 | 81 | 77 | 65 | 66 | 97 | 22 | 60.7 | 20.5 |
| | PART BROKEN | D | D | D | D | D | D | D | D | D | D | | | | |
| LEVEL 2 | PORTIONS INCLUDING PROTRUSION PORTIONS | 112 | 150 | 145 | 195 | 147 | 146 | 168 | 158 | 120 | 174 | 195 | 112 | 152 | 23.2 |
| | PART BROKEN | D | F | D | D | F | F | D | F | F | F | | | | | to fix the protrusion portions, and the other adhesion surface; the interface with high adhesive strength can be formed between each of the portions of the adhesive layer including no protrusion portions and the former adhesion surface; concurrently the protrusions can preclude the development of cracks; and accordingly the ceramic honeycomb structure body can be manufactured securely, where the adhesive strength of the adhesive layer is improved, in addition to the effects of the present invention as described as the fourth characteristic.

According to the sixth characteristic of the present invention, the interface with high adhesive strength is formed in an interface between each of the portions of the adhesive layer corresponding to the parts of the adhesion surface to which to fix the protrusion portions respectively and each of the parts of the adhesion surface opposite to the protrusion portions; the interface with high adhesive strength is formed in an interface between each of the portions of the adhesive layer including no protrusion portions and the adhesion surface to which the adhesive is applied; concurrently the protrusion portions can inhibit the development of cracks; and accordingly the ceramic honeycomb structure body can be manufactured securely, where the adhesive strength of the adhesive layer is improved, in addition to the effects of the present invention as described as the fourth characteristic.

The invention claimed is:

1. A ceramic honeycomb structure body which is formed by binding a plurality of porous honeycomb segments with an adhesive layer interposed between each neighboring two of the plurality of porous honeycomb, the adhesive layer being adhered to a first adhesion surface of one of the neighboring two porous honeycomb segments, and being adhered to a second adhesion surface of the other of the neighboring two porous honeycomb segments,
   wherein a first plurality of protrusion portions fixed to at least one of the first and second adhesion surfaces respectively of each neighboring two of the honeycomb segments are embedded in the adhesive layer, the two neighboring honeycomb segments being opposite to each other with the adhesive layer interposed therebetween;
   the first plurality of protrusion portions are not in contact with the other of the first and second adhesion surfaces, and
   the protrusion portions have substantially the same height.

2. The ceramic honeycomb structure body according to claim 1,
   wherein the first plurality of protrusion portions are formed of any one of one material selected out of inorganic materials and organic materials, a combination of at least two materials selected out of the inorganic materials and the organic materials.

3. The ceramic honeycomb structure body according to claim 1,
   wherein the first plurality of protrusion portions are formed in a way that the protrusion portions are 0.1 mm to 3.0 mm in thickness, and in a way that a total of a thickness of one of the protrusion portions and a thickness of a part of the adhesive layer corresponding to a part of the at least one of the first and second adhesion surfaces, to which the protrusion portions are fixed, is 0.2 mm to 4.0 mm.

4. A method of manufacturing a ceramic honeycomb structure body, which is formed by binding a plurality of porous honeycomb segments with an adhesive layer interposed between each neighboring two of the plurality of porous honeycomb segments, the adhesive layer being adhered to a first adhesion surface of one of the neighboring two porous honeycomb segments, and being adhered to a second adhesion surface of the other of the neighboring two porous honeycomb segments, comprising:
   applying an adhesive to one of the first and second adhesion surfaces to which a first plurality of protrusion portions are fixed, which is one of the opposing first and second adhesion surfaces respectively of each neighboring two of the honeycomb segments adhered to each other, in a way that the protrusion portions are embedded in the adhesive, and thereby forming the adhesive layer, the first plurality of protrusion portions are not in contact with the other of the first and second adhesion surfaces, the protrusion portions have substantially the same height; and
   thereafter pressing the two honeycomb segments against each other, with the adhesive layer interposed therebetween, in a direction which makes a gap between the opposing adhesion surfaces narrower, and thereby adhering the two honeycomb segments to each other.

5. The method of manufacturing the ceramic honeycomb structure body according to claim 4,
   wherein the protrusion portions are fixed to one of the opposing adhesion first and second surfaces, and the other of the first and second adhesion surfaces is formed so as to be flat, and
   wherein the adhesive layer is formed on only the one of the first and second adhesion surfaces, and thereafter the pressing is performed.

6. The method of manufacturing the ceramic honeycomb structure body according to claim 4,
   wherein a second plurality of protrusion portions are fixed to the other the opposing first and second adhesion surfaces, and
   wherein the adhesive layer is formed on each of the first and second adhesion surfaces, and thereafter the pressing is performed.

7. The ceramic honeycomb structure body according to claim 2,
   wherein the first plurality of protrusion portions are formed in a way that the protrusion portions are 0.1 mm to 3.0 mm in thickness, and in a way that a total of a thickness of one of the protrusion portions and a thickness of a part of the adhesive layer corresponding to a part of the at least one of the first and second adhesion surfaces to which the protrusion portions are fixed, is 0.2 mm to 4.0 mm.

8. The ceramic honeycomb structure body according to claim 1,
   wherein a second plurality of protrusion portions fixed to the other of the first and second adhesion surfaces respectively of each neighboring two of the honeycomb segments are embedded in the adhesive layer, the second plurality of protrusion portions are not in contact with the at least one of the first and second adhesion surfaces.

9. The method of manufacturing the ceramic honeycomb structure body according to claim 6, wherein the second plurality of protrusion portions are not in contact with the at least one of the first and second adhesion surfaces.

* * * * *